US010740422B2

(12) United States Patent
Chan et al.

(10) Patent No.: US 10,740,422 B2
(45) Date of Patent: Aug. 11, 2020

(54) SURFACING USER-SPECIFIC DATA RECORDS IN SEARCH (71) Applicant: Google LLC, Mountain View, CA (US)

(72) Inventors: Chengling Chan, Burlingame, CA (US); Maureen Heymans, San Francisco, CA (US); Jason L. Smart, Alamo, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/229,314

(22) Filed: Dec. 21, 2018

(65) Prior Publication Data

US 2019/0121829 A1    Apr. 25, 2019

Related U.S. Application Data (63) Continuation of application No. 15/627,781, filed on Jun. 20, 2017, now Pat. No. 10,162,903, which is a continuation of application No. 14/096,183, filed on Dec. 4, 2013, now Pat. No. 9,715,548.

(60) Provisional application No. 61/861,634, filed on Aug. 2, 2013.

(51) Int. Cl.
*G06F 16/9535* (2019.01)
*G06F 16/2455* (2019.01)

(52) U.S. Cl.
CPC ...... *G06F 16/9535* (2019.01); *G06F 16/2455* (2019.01)

(58) Field of Classification Search
CPC .. G06F 16/1748; G06F 3/0641; G06F 3/0608; G06F 11/1453; G06F 16/1752

USPC .......................................... 707/769
See application file for complete search history.

(56) References Cited

U.S. PATENT DOCUMENTS

| 8,126,904 | B1 | 2/2012 | Bettinger et al. |
| 8,166,026 | B1 | 4/2012 | Sadler |
| 8,290,894 | B2 | 10/2012 | Baier et al. |
| 8,386,454 | B2 | 2/2013 | Haas et al. |
| 8,429,111 | B1* | 4/2013 | Kailash ............... H03M 7/40 706/46 |

(Continued)

OTHER PUBLICATIONS

Extended European Search Report issued in European Application No. 14832776.0, dated Feb. 2, 2017, 10 pages.

(Continued)

*Primary Examiner* — Hosain T Alam
*Assistant Examiner* — Nicholas E Allen
(74) *Attorney, Agent, or Firm* — Fish & Richardson P.C.

(57) ABSTRACT

Implementations of the present disclosure include actions of receiving search results that are responsive to the search query, the search results being respectively representative of resources, processing one or more triggering rules based on at least one of the search query and the search results, determining, based on processing the one or more triggering rules, that a set of data records is to be displayed in a search results page with the search results, the set of data records including data records that are specific to the user, determining a display prominence of at least one data record in the set of data records, the display prominence indicating a prominence of the at least one data record when displayed in the search results page, and providing the search results and the set of data records for display, the at least one data record being displayed based on the display prominence.

13 Claims, 4 Drawing Sheets

(56) References Cited

U.S. PATENT DOCUMENTS

| | | | |
|---|---|---|---|
| 8,660,849 | B2 | 2/2014 | Gruber et al. |
| 2003/0058277 | A1 | 3/2003 | Bowman-Amuah |
| 2004/0267700 | A1 | 12/2004 | Dumais et al. |
| 2004/0267730 | A1 | 12/2004 | Dumais et al. |
| 2006/0248073 | A1 | 11/2006 | Jones et al. |
| 2007/0061712 | A1 | 3/2007 | Bodin et al. |
| 2008/0040315 | A1 | 2/2008 | Auerbach et al. |
| 2008/0071748 | A1* | 3/2008 | Wroblewski ............ H03M 7/30 |
| 2008/0071796 | A1 | 3/2008 | Ghuneim |
| 2008/0077558 | A1 | 3/2008 | Lawrence et al. |
| 2008/0189273 | A1 | 8/2008 | Kraftsow et al. |
| 2008/0201227 | A1 | 8/2008 | Bakewell |
| 2008/0275864 | A1 | 11/2008 | Kim et al. |
| 2009/0125482 | A1 | 5/2009 | Peregrine et al. |
| 2009/0287701 | A1 | 11/2009 | Breaker |
| 2010/0121656 | A1 | 5/2010 | Andros et al. |
| 2010/0153428 | A1 | 6/2010 | Schechter et al. |
| 2010/0153840 | A1 | 6/2010 | Abhyankar |
| 2010/0168994 | A1 | 7/2010 | Bourque |
| 2010/0168996 | A1 | 7/2010 | Bourque |
| 2010/0241663 | A1 | 9/2010 | Huang et al. |
| 2010/0257160 | A1 | 10/2010 | Cao |
| 2010/0306249 | A1 | 12/2010 | Hill |
| 2010/0332583 | A1 | 12/2010 | Szabo |
| 2011/0055062 | A1* | 3/2011 | Juntilla ................. G06Q 30/02 705/34 |
| 2011/0131241 | A1 | 6/2011 | Petrou et al. |
| 2011/0158307 | A1* | 6/2011 | Lee .................... H03M 7/3088 375/240 |
| 2011/0191326 | A1 | 8/2011 | Gutlapalli et al. |
| 2011/0196864 | A1 | 8/2011 | Mason et al. |
| 2011/0196935 | A1 | 8/2011 | Rideout et al. |
| 2011/0202522 | A1 | 8/2011 | Ciemiewicz |
| 2011/0212430 | A1 | 9/2011 | Smithmier |
| 2011/0218992 | A1 | 9/2011 | Waldman |
| 2011/0289422 | A1 | 11/2011 | Spivack et al. |
| 2011/0314372 | A1 | 12/2011 | Teevan |
| 2011/0320437 | A1 | 12/2011 | Kim et al. |
| 2012/0054204 | A1 | 3/2012 | Agarwal |
| 2012/0095975 | A1 | 4/2012 | Billingsley et al. |
| 2012/0158633 | A1* | 6/2012 | Eder .................... G06N 5/022 706/46 |
| 2012/0166435 | A1 | 6/2012 | Graham |
| 2012/0166925 | A1 | 6/2012 | Boerries et al. |
| 2012/0212484 | A1 | 8/2012 | Haddick et al. |
| 2012/0278837 | A1 | 11/2012 | Curtis |
| 2012/0317109 | A1 | 12/2012 | Richter |
| 2013/0019202 | A1 | 1/2013 | Regan |
| 2013/0054558 | A1 | 2/2013 | Raza |
| 2013/0067364 | A1 | 3/2013 | Berntson |
| 2013/0086025 | A1 | 4/2013 | Hebert |
| 2013/0086499 | A1 | 4/2013 | Dyor |
| 2013/0110804 | A1 | 5/2013 | Davis |
| 2013/0124538 | A1 | 5/2013 | Lee et al. |
| 2013/0138609 | A1 | 5/2013 | Schleifer et al. |
| 2013/0185277 | A1 | 7/2013 | Hampole et al. |
| 2013/0185289 | A1 | 7/2013 | Chowdhurty |
| 2013/0198152 | A1* | 8/2013 | McGhee ............ H03M 7/3088 707/693 |
| 2013/0198171 | A1 | 8/2013 | Shah |
| 2013/0198174 | A1 | 8/2013 | Poznanski |
| 2013/0198224 | A1 | 8/2013 | Sharma |
| 2013/0212487 | A1 | 8/2013 | Cote |
| 2013/0290339 | A1* | 10/2013 | LuVogt ................. G06Q 10/10 707/740 |
| 2014/0188766 | A1 | 7/2014 | Waldman et al. |
| 2014/0188925 | A1* | 7/2014 | Skolicki ............ H04N 21/4622 707/765 |
| 2014/0236978 | A1 | 8/2014 | King et al. |
| 2014/0280214 | A1* | 9/2014 | Han ........................ G06F 16/90 707/748 |
| 2014/0280292 | A1* | 9/2014 | Skinder ............ G06F 16/24534 707/767 |
| 2014/0337791 | A1 | 11/2014 | Agnetta et al. |
| 2015/0012524 | A1* | 1/2015 | Heymans ............... G06F 16/335 707/722 |
| 2015/0032757 | A1* | 1/2015 | Barykin ............. G06F 16/2228 707/741 |
| 2015/0058324 | A1 | 2/2015 | Kauwe |
| 2015/0088813 | A1* | 3/2015 | Lahiri ..................... G06F 16/21 707/609 |
| 2015/0100509 | A1 | 4/2015 | Pappas et al. |
| 2015/0113026 | A1* | 4/2015 | Sharique ............... G06F 16/221 707/812 |
| 2015/0220492 | A1 | 8/2015 | Simeonov |

OTHER PUBLICATIONS

International Preliminary Report on Patentability in International Application No. PCT/US2014/044069, dated Feb. 11, 2016, 8 pages.

International Search Report and Written Opinion in International Application No. PCT/US2014/044069, dated Nov. 14, 2014, 9 pages.

Sullivan, "Up Close: Gmail in Google Search Results Field Trial," Search Engine Land [online], Aug. 8, 2012 [retrieved Feb. 10, 2015]. Retrieved from the internet: http://searchengineland.com/up-close-the-gmail-in-google-search-results-field-trial-130035, 7 pages.

\* cited by examiner

SURFACING USER-SPECIFIC DATA RECORDS IN SEARCH

CROSS REFERENCE TO RELATED APPLICATIONS

This application is a continuation application of, and claims priority to U.S. application Ser. No. 15/627,781, filed Jun. 20, 2017, titled "Surfacing User-Specific Data Records In Search," which application is a continuation application of, and claims priority to U.S. application Ser. No. 14/096,183, filed Dec. 4, 2013, titled "Surfacing User-Specific Data Records In Search," which application claims priority under 35 U.S.C. § 119 to U.S. Provisional Patent Application Ser. No. 61/861,634, filed Aug. 2, 2013, titled "Surfacing User-Specific Data Records In Search." The disclosure of each of the foregoing applications is incorporated herein by reference.

BACKGROUND

This specification relates to displaying search results.

The Internet provides access to a wide variety of resources, such as image files, audio files, video files, and web pages. A search system can identify resources in response to queries submitted by users and provide information about the resources in a manner that is useful to the users. The users then navigate through (e.g., click on) the search results to acquire information of interest to the users.

Users of search systems are often searching for information regarding a specific entity. For example, users may want to learn about a singer that they just heard on the radio. Conventionally, the user would initiate a search for the singer and select from a list of search results determined to be relevant to the singer.

SUMMARY

Implementations of the present disclosure are generally directed to displaying user-specific data records with search results. More particularly, implementations of the present disclosure are directed to determining that a set of data records is to be displayed with search results, and determining a display prominence of data records.

In general, innovative aspects of the subject matter described in this specification can be embodied in methods that include actions of receiving a search query, the search query being provided by a user, receiving one or more search results that are responsive to the search query, the one or more search results being respectively representative of one or more resources, processing one or more triggering rules based on at least one of the search query and the search results, determining, based on processing the one or more triggering rules, that a set of data records is to be displayed in a search results page with the search results, the set of data records including one or more data records that are specific to the user, determining a display prominence of at least one data record in the set of data records, the display prominence indicating a prominence of the at least one data record when displayed in the search results page, and providing the search results and the set of data records for display, the at least one data record being displayed based on the display prominence. Other implementations of this aspect include corresponding systems, apparatus, and computer programs, configured to perform the actions of the methods, encoded on computer storage devices.

These and other implementations can each optionally include one or more of the following features: the display prominence indicates a position of the at least one data record within the search results page; the display prominence indicates a visual effect to the at least one data record within the search results page; determining a display prominence includes: determining at least one of a time and a date associated with the at least one data record, and determining the display prominence based on the at least one of a time and a date, and a threshold time; the display prominence is set to a first value in response to a time difference exceeding the threshold time, the time difference being determined based on the at least one of a time and a date, and the display prominence is set to a second value in response to the time difference not exceeding the threshold time; all data records in the set of data records is associated with the display prominence; a triggering rule of the one or more triggering rules triggers display of the set of data records based on whether a knowledge panel is to be displayed in response to the search query; a triggering rule of the one or more triggering rules triggers display of the set of data records based on whether the search results include a personal search result and an electronic document corresponding to the personal search results also corresponds to a data record; a triggering rule of the one or more triggering rules triggers display of the set of data records based on whether a term in the search query matches information provided in data records of a superset of data records that are specific to the user; providing the search results and the set of data records for display includes providing a search results display, the search results display displaying the search results and the set of data records, the at least one data record being displayed within the search results display based on the display prominence.

Particular implementations of the subject matter described in this specification can be implemented so as to realize one or more of the following advantages. In some examples, given a search query, e.g., keyword, phrase, question, provided to a search system, a user's intent can be determined and user-specific, e.g., personal, search results can be provided, which are relevant to that user. In some examples, an intent of a user in submitting the search query can be determined based on general search results, e.g., public search results that are not specific to the particular user. In this manner, triggering of a display of data records can more accurately reflect an intent of the user.

Other features, aspects, and advantages of the subject matter will become apparent from following description, drawings, and claims.

BRIEF DESCRIPTION OF THE DRAWINGS

Like reference numbers and designations in the various drawings indicate like elements.

DETAILED DESCRIPTION

Figure 1:
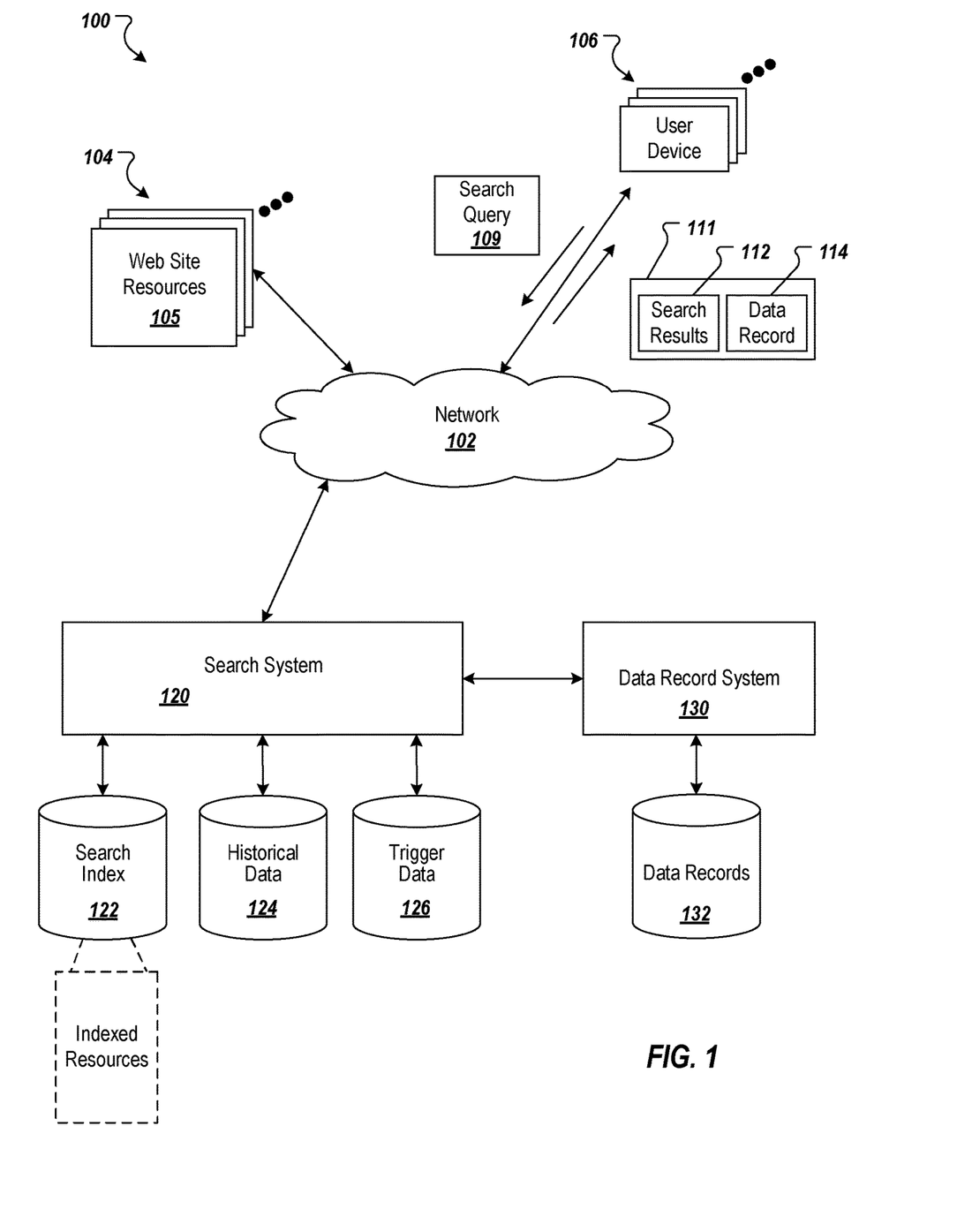
FIG. 1 is a block diagram of an example environment in which a search system provides search services.

FIG. 1 is a block diagram of an example environment 100 in which a search system 120 provides search services. The example environment 100 includes a network 102, e.g., a local area network (LAN), wide area network (WAN), the Internet, or a combination thereof, connects web sites 104, user devices 106, and the search system 120. In some examples, the network 102 can be accessed over a wired and/or a wireless communications link. For example, mobile computing devices, such as smartphones can utilize a cellular network to access the network. The environment 100 may include millions of web sites 104 and user devices 106.

In some examples, a web site 104 is provided as one or more resources 105 associated with a domain name and hosted by one or more servers. An example web site is a collection of web pages formatted in an appropriate machine-readable language, e.g., hypertext markup language (HTML), that can contain text, images, multimedia content, and programming elements, e.g., scripts. Each web site 104 is maintained by a publisher, e.g., an entity that manages and/or owns the web site.

In some examples, a resource 105 is data provided over the network 102 and that is associated with a resource address, e.g., a uniform resource locator (URL). In some examples, resources 105 that can be provided by a web site 104 include web pages, word processing documents, and portable document format (PDF) documents, images, video, and feed sources, among other appropriate digital content. The resources 105 can include content, e.g., words, phrases, images and sounds and may include embedded information, e.g., meta information and hyperlinks, and/or embedded instructions, e.g., scripts.

In some examples, a user device 106 is an electronic device that is under control of a user and is capable of requesting and receiving resources 105 over the network 102. Example user devices 106 include personal computers, mobile computing devices, e.g., smartphones and/or tablet computing devices that can send and receive data over the network 102. As used throughout this document, the term mobile computing device ("mobile device") refers to a user device that is configured to communicate over a mobile communications network. A smartphone, e.g., a phone that is enabled to communicate over the Internet, is an example of a mobile device. A user device 106 typically includes a user application, e.g., a web browser, to facilitate the sending and receiving of data over the network 102.

In some examples, to facilitate searching of resources 105, the search system 120 identifies the resources 105 by crawling and indexing the resources 105 provided on web sites 104. Data about the resources 105 can be indexed based on the resource to which the data corresponds. The indexed and, optionally, cached copies of the resources 105 are stored in a search index 122.

The user devices 106 submit search queries 109 to the search system 120. In some examples, a user device 106 can include one or more input modalities. Example modalities can include a keyboard, a touchscreen and/or a microphone. For example, a user can use a keyboard and/or touchscreen to type in a search query. As another example, a user can speak a search query, the user speech being captured through a microphone, and being processed through speech recognition to provide the search query.

In response to receiving a search query 109, the search system 120 accesses the search index 122 to identify resources 105 that are relevant to, e.g., have at least a minimum specified relevance score for, the search query 109. The search system 120 identifies the resources 105, generates a search results display 111 that includes search results 112 identifying resources 105, and returns the search results display 111 to the user devices 106. In an example context, a search results display can include one or more web pages, e.g., one or more search results pages. In some examples, a web page can be provided based on a web document that can be written in any appropriate machine-readable language. It is contemplated, however, that implementations of the present disclosure can include other appropriate display types. For example, the search results can be provided in a display generated by an application that is executed on a computing device, and/or a display generated by an operating system, e.g., mobile operating system. In some examples, search results can be provided based on any appropriate form, e.g., Javascript-html, plaintext.

A search result 112 is data generated by the search system 120 that identifies a resource 105 that is responsive to a particular search query, and includes a link to the resource 105. An example search result 112 can include a web page title, a snippet of text or a portion of an image extracted from the web page, and the URL of the web page. In some examples, data provided in the search results 112 can be retrieved from a resource data store. For example, the search system 120 can provide the search results display 111, which displays the search results 112. In some examples, the search results display 111 can be populated with information, e.g., a web page title, a snippet of text or a portion of an image extracted from the web page, that is provided from the resource data store.

In some examples, data for the search queries 109 submitted during user sessions are stored in a data store, such as the historical data store 124. For example, the search system 120 can store received search queries in the historical data store 124.

In some examples, selection data specifying actions taken in response to search results 112 provided in response to each search query 109 are also stored in the historical data store 124, for example, by the search system 120. These actions can include whether a search result 112 was selected, e.g., clicked or hovered over with a pointer). The selection data can also include, for each selection of a search result 112, data identifying the search query 109 for which the search result 112 was provided.

In accordance with implementations of the present disclosure, the example environment 100 also includes a data record system 130 communicably coupled to the search system 120, e.g., directly coupled or coupled over a network such as network 102. In some examples, the search system 120 can interact with the data record system 130 to provide one or more data records that are specific to the user that submitted the search query 109. In some examples, the data record system 130 can provide data records that can be included within the search results 112 based on data records stored in a data records data store 132. In some examples, the data records data store 132 may include information specific to the user that submitted the search query 109. In some examples, the data records data store 132 may include this data for many different users. In some examples, the data records data store 132 may be a dedicated data store specific to the user submitting the search query 109.

In some implementations, the data record system 130 may receive the search query and an identification of the user from the search system 120. For example, the user can be logged into a search service that provides the search system 120. In response, the data record system 130 can provide a set of data records to the search system 120. In some examples, the set of data records can include one or more data records.

In some implementations, the data record system 130 can provide the set of data records that can be displayed in the search results display 111. In some examples, a display prominence of the one or more data records within the search results display 111 is determined. In some examples, the search system 120 determines the display prominence. In some examples, the data record system 130 determines the display prominence. In some examples, the display prominence can include a position of each data record within the search results display 111 and/or visual effects that can be added to data records within the search results display 111. For example, a data record can be displayed at a top portion of the search results display 111, e.g., above search results, such that the data record is prominently displayed to the user. As another example, the data record can be displayed on a side portion, e.g., left-hand-side, right-hand-side, of the search results display, such that the data record is less prominently displayed to the user, e.g., relative to if the data record had been displayed in the top portion.

In some examples, the search system 120 generates a search result display 111 based on the retrieved digital content. In this manner, the search results 112, e.g., provided in the search results display 111, can be tailored to the user that submitted the search query 109.

In some examples, a data record can be specific to a user and can be generated based on one or more electronic documents associated with the user. For example, an electronic document can include data that can be used to populate a data record. Example electronic documents can include electronic mail messages, instant messages (IMs), short message system (SMS) messages, social networking posts, word processing documents, images, e.g., image recognition, optical character recognition, barcodes, electronic calendar items, electronic meeting invitations, audio transcripts, or other appropriate sources of information.

In some examples, an electronic document can be associated with a category. Example categories can include travel, e.g., travel reservations, lodging, e.g., hotel reservations, commerce, e.g., product purchases, events, e.g., theater performances, movies, concerts, sporting events, and restaurants, e.g., restaurant reservation. In some examples, the electronic document can convey a booking confirmation, travel itinerary, hotel reservation confirmation, shipment notification, order tracking update, purchase receipt, restaurant reservation confirmation, or other appropriate forms of data. In some examples, a category of an electronic document can be determined based on an identifier and/or data provided in the electronic document.

In some examples, a data record can be specific to a category, and fields in the plurality of fields can be relevant to the category. For example, the data record can be specific to the flight reservation category and can include category-specific data fields, e.g., confirmation number, flight number, departure airport, arrival airport, departure date/time, arrival date/time. As another example, the data record can be specific to the hotel reservation category and can include category-specific data fields, e.g., reservation number, check-in date, check-out date, room rate, room type. As another example, the data record can be specific to the purchases category and can include category-specific data fields, e.g., product name, product identifier, quantity, cost, estimated shipping date, actual shipping date, tracking number.

The data record, once populated, is stored in a data repository, e.g., the data records data store 132. In some implementations, the data repository can include one or more tables in one or more databases, one or more flat files, or combinations of these and any other appropriate format for the storage and retrieval of information such as data records.

Implementations of the present disclosure are generally directed to determining whether to display one or more data records in search results, and determining a display prominence associated with each data record. In some implementations, and as discussed in further detail herein, one or more triggering rules are provided, the triggering rules being processed to determine whether one or more data records are to be displayed. In some examples, a search query and one or more data records can be processed to determine the display prominence of one or more data records that are to be displayed. In some examples, additional data can also be processed to determine the display prominence.

Implementations of the present disclosure are discussed in further detail herein with reference to an example context. The example context includes data records associated with the flight reservation category. It is contemplated, however, that implementations of the present disclosure can be provided in other contexts. For example, implementations of the present disclosure can be provided with data records associated with travel, e.g., the flight reservation category, lodging, e.g., hotel reservations, commerce, e.g., product purchases, events, e.g., theater performances, movies, concerts, sporting events, and restaurants, e.g., restaurant reservations.

User information, e.g., information about a user's social network, social actions or activities, profession, a user's preferences, a user's current location, is collected or used by systems subject to user consent. Users are given an opportunity to consent to whether the user information is collected. Users can select whether and/or how to receive content that may be more relevant to the user. In addition, certain data may be treated in one or more ways before it is stored or used, so that it is anonymized, so that personally identifiable information is removed, and/or so that it is encrypted.

In accordance with implementations of the present disclosure, a user can submit a search query to a search service, e.g., the search query 109 submitted to the search system 120. In some examples, the search query and a superset of data records are processed to determine whether a set of data records is to be displayed. In some examples, the superset of data records includes data records that are specific to the user that submitted the search query. In some examples, the set of data records is a sub-set of the superset of data records. In some examples, the set of data records includes one or more data records. In some examples, the superset of data records includes data records that are specific to a user, e.g., the user that submitted the search query.

In some examples, data records of the superset of data records can be determined to be relevant to the search query. If, for example, a data record is determined to be relevant to the search query, the data record is included in the set of data records. With reference to the example context, an example search query can include [flights]. In such an example, a user intent may not be clear, e.g., an intent to retrieve user-specific search results, or an intent to retrieve general search results. In some examples, the example search query can be more specific, e.g., [flight from san francisco to austin], [generic airways flight]. In such an example, a user intent may be clear, e.g., an intent to retrieve user-specific search results. In response to the search query, data records that are relevant to flight reservations made by the user can be provided in the set of data records.

In accordance with implementations of the present disclosure, whether a data record is relevant to a search query can be determined based on the one or more triggering rules. In some examples, a triggering rule defines a set of conditions where, if each condition is true, one or more data records from the superset of data records are included in the set of data records that are to be displayed. In some examples, the set of conditions can include one or more conditions. Example triggering rules are discussed in further detail below with reference to the example context. It is contemplated that example triggering rules can be applicable in other contexts.

An example triggering rule can trigger display of a set of data records based on whether a knowledge panel is to be displayed in response to the search query. In some examples, a knowledge panel system can process the search query and can determine whether a knowledge panel is to be displayed. In some examples, the knowledge panel system can provide a signal to the search system and/or the data record system, the signal indicating that a knowledge panel is to be displayed.

In some examples, a knowledge panel can be provided for queries that have been determined to reference a particular entity, such as a person, place, country, landmark, animal, historical event, organization, business, sports team, sporting event, movie, song, album, game, work of art, or any other appropriate entity. For example, one or more topics can be determined from the submitted search query, and it can be determined that the one or more topics correspond to a topic, for which a knowledge panel is available. In response, the knowledge panel can be triggered for display.

In general, a knowledge panel for a particular entity can include content related to the particular entity. In some implementations, a knowledge panel includes a set of factual information deemed relevant to the particular entity. As one example, the example search query [AUS flights] can result in a knowledge panel being displayed in the search results. In this example, the knowledge panel can include content reflecting airline flights to and/or from Austin, Tex., e.g., departure cities, arrival cities, flight durations, airlines.

The example triggering rule can provide that, if a knowledge panel is to be displayed in response to the search query, and if information that is to be displayed in the knowledge panel corresponds to data provided in data records of the superset of data records, then a set of data records is to be displayed. Continuing with the example context, the example search query [Austin flights] can be received. In some examples, additional terms can be provided. For example, the International Air Transport Association (IATA) airport code for Austin-Bergstrom International Airport can be provided, which is AUS. It can be determined that a knowledge panel is to be displayed. For example, a signal can be received, the signal indicating that a knowledge panel is to be displayed. In response to determining that a knowledge panel is to be displayed, information can be compared to information provided in data records of the superset of data records. In the example context, the IATA code AUS can be compared to departure city and/or arrival city information provided in data records. In this example, if the IATA code AUS is provided in a data record, the data record is included in the set of data records to be displayed with the search results.

Another example triggering rule can trigger display of a set of data records based on whether a term in the search query matches information provided in data records of the superset of data records. In some examples, a term in the search query is determined to match information, if the match is an exact match. Continuing with the example context, the example search query [AUS flights] can be received. The search term AUS can be compared to IATA airport codes provided in data records. If a data record includes the IATA airport code AUS, e.g., as departure airport, as arrival airport, the data record is included in the set of data records to be displayed.

Another example triggering rule can trigger display of a set of data records based on search results that are to be provided in response to the search query. In some examples, if information associated with one or more search results corresponds to data provided in data records of the superset of data records, then a set of data records is to be displayed. Continuing with the example context, the example search query [Generic Airways] can be received, where "Generic Airways" is provided as a fictitious airline. Search results responsive to the example search query can be received. In some examples, it can be determined that a website associated with Generic Airways is provided in the search results, e.g., the official website for Generic Airways. In response, an IATA airline code for Generic Airways, e.g., GW, can be provided and can be compared to IATA airline codes in data records of the superset of data records. If a data record includes the IATA airline code GA, the data record is included in the set of data records to be displayed.

Continuing with the example context, another example triggering rule can trigger display of a set of data records based on whether the search query includes a flight number that corresponds to flight information provided in data records of the superset of data records. In some examples, if at least one of a flight number and an IATA airline code of the search query correspond to a data record, the data record is included in the set of data records that are to be displayed. In some examples, if both the flight number and the IATA airline code of the search query correspond to a data record, the data record is included in the set of data records that are to be displayed. The example search query [GA 432] can be received. The search terms GA and 432 can be respectively compared to flight numbers and/or IATA airline codes provided in data records.

Another example triggering rule can trigger display of a set of data records based on whether the search query and/or search results that are responsive to the search query are related to a category of the data records, whether search results that are responsive to the search query correspond to information provided in data records, and whether a knowledge panel is to be displayed. For example, the example triggering rule can provide that, if the search query and/or the search results are related to a category of data records, if the search results correspond to information provided in data records, and if a knowledge panel is not to be displayed, then a set of data records are to be displayed. In this manner, it can be implicitly determined whether the display of data records would be beneficial to the user based on the received search query and the search results that are responsive to the search query.

In some examples, the search query can be processed and one or more categories associated with the search query can be identified. If a category of the one or more categories matches a category of data records, discussed above, it can be determined that the search query is related to a category of the data records. In some examples, the search results that are to be displayed in response to the search query can be processed and one or more categories associated with the search results can be identified. If a category of the one or more categories matches a category of data records, discussed above, it can be determined that the search query is related to a category of the data records.

In some examples, each search result can have one or more categories associated therewith. For example, a website of an airline can be associated with the flight category.

Consequently, a search result corresponding to the website can be vicariously associated with the flight category. In some examples, category levels can be provided as primary categories, secondary categories, or tertiary categories. In some examples, each category level can be assigned a respective value, e.g., 2, 1, 0, respectively. In some examples, category levels of the search results can be summed to provide a total category level for the search results as a whole. As noted above, search results can be associated with one or more categories. Consequently, respective one or more total category levels can be provided.

In some examples, each total category level can be compared to a threshold category level to determine whether the search results, as a whole, correspond to the particular category. In some examples, if the category level exceeds the threshold category level, the search results, as a whole, are determined to be associated with the particular category.

In some examples, whether search results correspond to information provided in data records can be determined based on one or more locations associated with individual search results. In some examples, a search result can be associated with a location. In some examples, the location can be provided as a city, e.g., Austin. In some examples, the location can be provided as coordinates, e.g., latitude and longitude. In some examples, search results having a location that is determined to be proximate to a location, from which the user submitted the search query are ignored. For example, the user can be located in San Francisco and can submit the example search query [hiking trip to texas hill country]. Example search results that are responsive to the search query can include search results associated with locations near central Texas, e.g., Texas hill country, as discussed below. In some examples, search results can also include search results associated with locations near San Francisco, e.g., a retailer that sells hiking equipment. In this example, the example triggering rule ignores search results that are proximate to the location, from which the user submitted the search query.

In some examples, a location score can be determined for each location based on proximity to another location. In some examples, the location can be determined based on a category that the search results are determined to correspond to, as discussed above. For example, if the search results are determined to correspond to the flight category, the location can include an airport. If, the location score exceeds a threshold score relative to another location that is in data records of the superset of data records, the search result can be determined to correspond to information provided in the data records. In some examples, the search results, as a whole, are determined to correspond to information provided in the data records, if the number of search results that correspond to information provided in data records exceeds a threshold number of search results.

Continuing with the example context, the example search query [hiking trip to texas hill country] can be received, and search results can be provided. In some examples, the search results can be associated with hiking trails, parks, recreational facilities and/or outdoor equipment retailers that are associated with the Texas hill country. One or more search results can be associated with a location, e.g., a city in which an outdoor equipment retailer is located, a city in which and/or coordinates at which a hiking trail is located. A location of an airport, e.g., AUS, can be determined and can be compared to locations associated with the search results to provide respective location scores. In some examples, the airport is provided as an arrival airport, e.g., destination airport, that is provided in the data records.

In some examples, a location scoring service can process location information to provide the location scores. In some examples, the location scores can be determined based on a distance between the airport, e.g., AUS, and the locations of the search results. In some examples, a location that is near to the airport can have a higher score than a location that is further from the airport. In some examples, a location score can range between a minimum value, e.g., 0, and a maximum value, e.g., 1. In some examples, if a distance between a location associated with a search result and the airport exceeds a first threshold difference, e.g., 100 miles, the location score for the search result is set equal to the minimum value. In some examples, if a distance between a location associated with a search result and the airport is below a second threshold difference, e.g., 10 miles, the location score for the search result is set equal to the maximum value.

Continuing with the example above, the example search query [hiking trip to texas hill country] can be received, and five example search results can be provided that are responsive to the search query. The five example search results can include a first retailer located 8 miles from AUS, a second retailer located 40 miles from AUS, a first recreational area located 70 miles from AUS, a second recreational area located 110 miles from AUS, and a hiking trail located 50 miles from AUS. Respective location scores can be provided for each of the example search results. For example, a first location score associated with the first retailer can be equal to a maximum value, e.g., 1, a second location score associated with the second retailer can be equal to a value that is between the minimum value and the maximum value, a third location score associated with the first recreational area can be equal to a value that is between the minimum value and the maximum value, a fourth location score associated with the second recreational area can be equal to the minimum value, e.g., 0, and a fifth location score associated with the hiking trail can be equal to a value that is between the minimum value and the maximum value.

As discussed above, each location score can be compared to a threshold score to determine whether the respective search result corresponds to information provided in the superset of data records. More particularly, if, the location score associated with a search result exceeds the threshold score, the search result is determined to correspond to information provided in the data records. If, the location score associated with a search result does not exceed the threshold score, the search result is determined not to correspond to information provided in the data records. Continuing with the example above, it can be determined that the first location score, the second location score, the third location score and the fifth location score each exceed the threshold score. Consequently, the respective search results are determined to correspond to information provided in the data records.

As discussed above, it can be determined whether the search results, as a whole, correspond to information provided in the data records. More specifically, if the number of search results that correspond to information provided in data records exceeds a threshold number of search results, it is determined that the search results, as a whole, correspond to information provided in the data records. Continuing with the example above, an example threshold number of search results can be provided as three. Because, in the example, it was determined that the first location score, the second location score, the third location score and the fifth location score each exceed the threshold score, the number of search results that correspond to information provided in data records is equal to four. Consequently, the number of search results exceeds the threshold number of search results, and it is determined that the search results, as a whole, correspond to information provided in the data records, and a set of data records is provided to be displayed in the search results.

Another example trigger rule can trigger display of a set of data records based on whether one or more search terms of the search query exactly match one or more trigger keywords. In some examples, the one or more trigger keywords can be provided for respective categories. In the example context, example trigger keywords can include "flight," "flights," "my flight," "my flights" "confirmation," and "booking." In some examples, if the search query includes a trigger keyword, a set of data records is to be displayed with the search results.

In some implementations, the search results can include personal search results. In some examples, a personal search result can include user-specific content that is specific to the user that submitted the search query, and that is responsive to the search query. In some examples, user-generated content can include content that is generated using one or more computer-implemented services. Example computer-implemented services can include a social networking service, an electronic messaging service, a chat service, a micro-blogging service, a blogging service and a digital content sharing service. In some examples, the user-generated content can include content that is provided in electronic messages, chat sessions, posts to social networking services, content posted to sharing services, e.g., photo sharing services, and/or content posted to a blogging service.

In accordance with implementations of the present disclosure, user-specific content can be provided in an electronic document that was used to generate one or more data records, as discussed above. Continuing with the example context, an electronic document can include a confirmation message sent from an airline to the user, confirming a flight that the user booked. In some examples, a data record for the flight can be provided based on the electronic document.

In view of this, another example triggering rule can trigger display of a set of data records based on whether the search results include personal search results, and a personal search result corresponds to user-specific content that was used to provide a data record. For example, search results can include a personal search result that is representative of an electronic document. It can be determined that a data record in the superset of data records was generated based on the electronic document. Consequently, the data record can be included in a set of data records that are to be displayed with the search results.

As discussed above, one or more trigger rules can trigger display of a set of data records with search results, the set of data records including one or more data records. In some examples, a threshold number of data records can be displayed. For example, it can be determined that X data records could be displayed with the search results, but a threshold number of data records can include Y data records, wherein Y is less than X. Consequently, only Y data records of the X data records are provided in the set of data records that are to be displayed. In some examples, data records that are included in the set of data records can be selected based on time. For example, data records can be provided in chronological order, e.g., based on departure date and time, and the first Y data records are included in the set of data records. In some examples, the data records in the set of data records can be displayed in the chronological order.

In accordance with implementations of the present disclosure, after it is determined that one or more data records are to be displayed, a display prominence of each data record of the set of data records is determined. In some examples, every data record in the set of data records is assigned the same display prominence. In some examples, each data record in the set of data records has a data record-specific display prominence. As introduced above, the display can include a position of each data record within the search results display and/or visual effects that can be added to data records within the search results display. For example, a data record can be displayed at a top portion of the search results display, e.g., above search results, such that the data record is prominently displayed to the user. As another example, the data record can be displayed on a side portion, e.g., left-hand-side, right-hand-side, of the search results display, such that the data record is less prominently displayed to the user, e.g., relative to if the data record had been displayed in the top portion. In some examples, visual effects can include highlighting, bolding, animating and/or any other appropriate visual effect that can draw a user's attention to data records within the search results display.

In some implementations, the display prominence is determined based on one or more times and/or dates associated with a respective data record. Example times and/or dates can include departure time/date of a flight, time/date for check-in at a hotel, and time/date of an event. In the example context, the time and/or date is provided as the departure time/date of a flight. In some examples, if the time/date associated with a data record exceeds a threshold time, e.g., provided in seconds, minutes, hours, and/or days, the display prominence is provided as a first value, e.g., 0, indicating that the respective data record is not to be prominently displayed, e.g., displayed on a side portion of the search results display and/or without visual effects. In some examples, if the time/date associated with a data record does not exceed the threshold time, the display prominence is provided as a second value, e.g., 1, indicating that the respective data record is to be displayed prominently, e.g., on a top portion of the search results display and/or with visual effects.

Figure 2A:
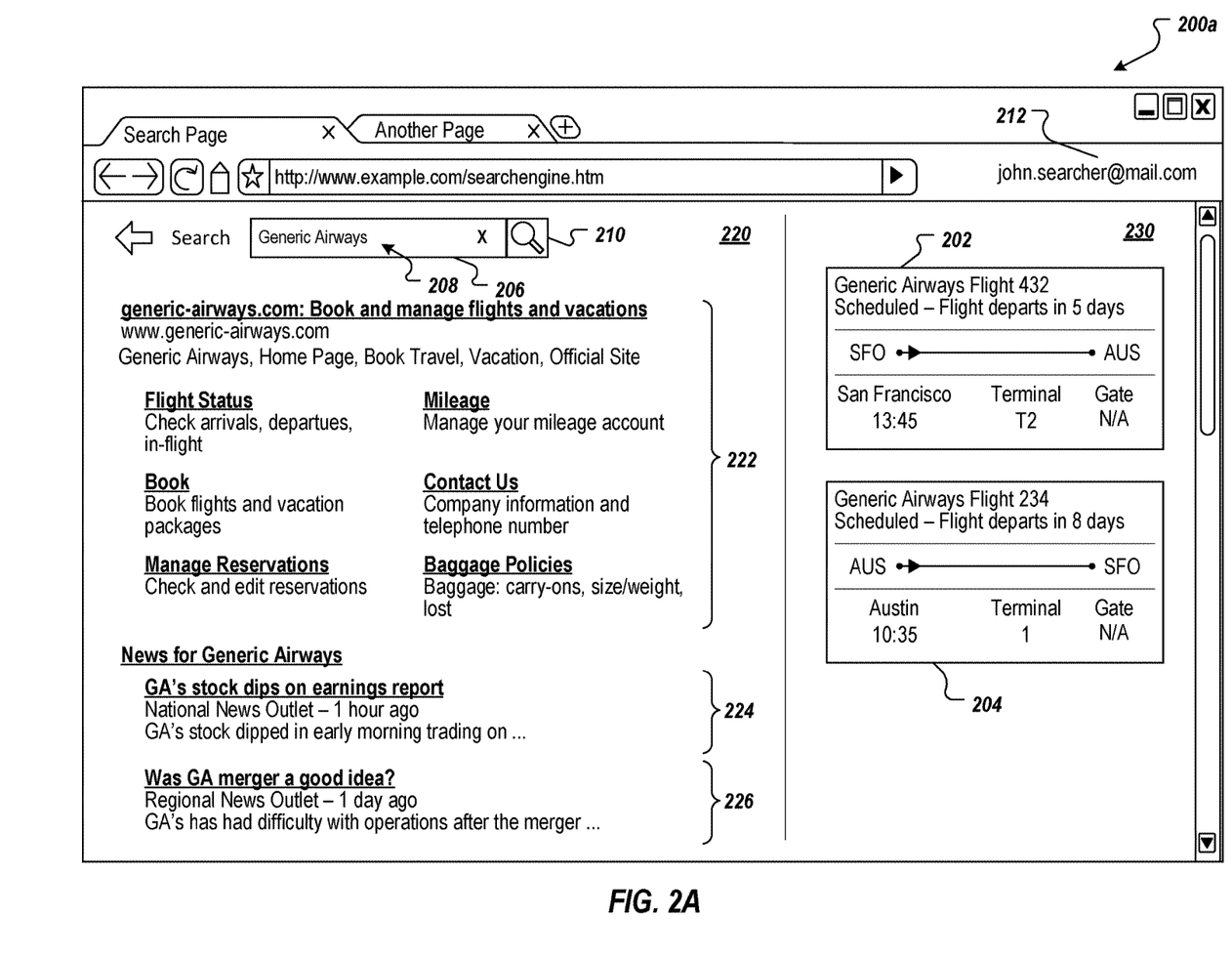
FIGS. 2A and 2B depict respective example search results displays including data records.
Figure 2B:
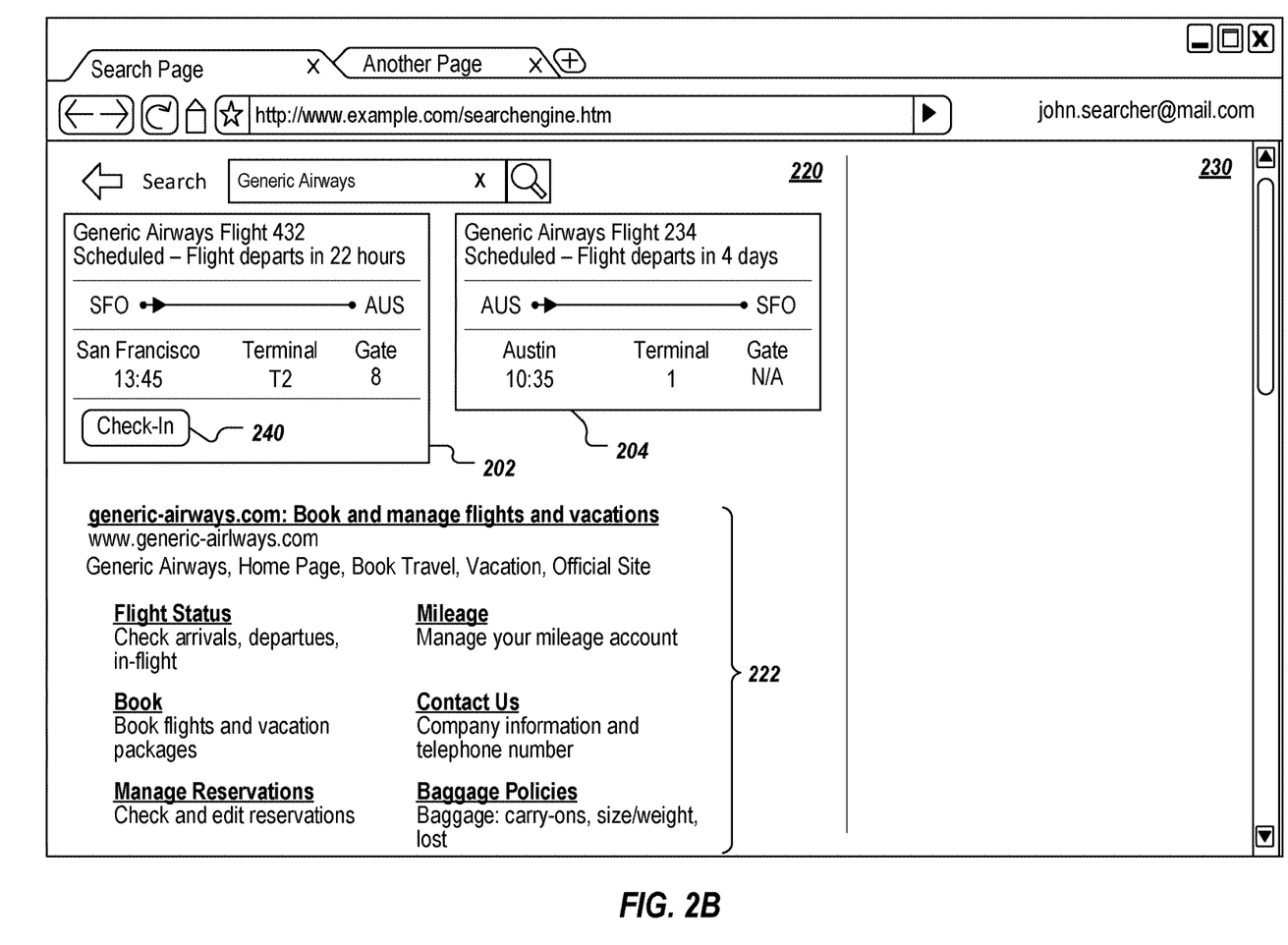

FIGS. 2A and 2B depict respective example search results displays 200a, 200b including data records 202, 204. In the examples of FIGS. 2A and 2B, the search results displays 200a, 200b are provided as web pages, e.g., search results pages. Implementations of the present disclosure, however, can include other appropriate displays.

FIG. 2A depicts the example search results display 200a including the data records 202, 204 being displayed less prominently. Although the example search results displays 200a, 200b are depicted inside a web browser, this is for context only and is not intended to limit the scope of the present disclosure to any one web browser or even to implementations involving serving a web page. The example search results display 200a includes a search box 206. In some implementations, the search box 206 may be a text box specified using an appropriate machine-readable language, e.g., HTML. In implementations, the search box 206 may be a custom component specified by another suitable web development language such as Javascript. The illustrated search box 206 includes a search query 208. In the depicted example, the search query includes [Generic Airways], which is the name of a fictitious airline, as discussed above. In some examples, the search query 208 may be entered by a user. In some examples, the search query 208 may be programmatically received through an application programmer interface (API) or other suitable means. The illustrated search box 206 is also associated with a search button 210. In some examples, a user may perform a search on the search query 208 by activating, e.g., clicking on, the search button 210. This activation may be performed by any appropriate mechanism such as clicking the search button 210 with a pointing device (e.g., a mouse) or pressing a key or combination of keys on a keyboard. In some examples, the search query 208 can be automatically submitted as it is being entered.

The illustrated search results display 200a also includes first user information 212. In the illustrated example, the first user information 212 indicates that the user "john.searcher@mail.com" is currently logged in. In accordance with implementations of the present disclosure, data records provided within search results will be specific to the user john.searcher@mail.com. In some implementations, the search results display 200a might not include an indication of the current user, but the search query 208 may still be processed according to the current user.

The illustrated search results display 200a also includes a search results pane 220 including one or more search results 222, 224, 226. In some implementations, the search results pane 220 is a frame segregating the search results from other panes of the search results display 200a. In some implementations, the search results pane 220 is provided as a consecutive list of search results. The illustrated search results display 200a includes an auxiliary pane 230. The data records 202, 204 are displayed within the auxiliary pane 230.

In the example of FIG. 2A, the search query 208 [Generic Airways] was entered by the user and was processed by a search system, e.g., the search system 120 of FIG. 1, in view of one or more trigger rules. Based on the one or more trigger rules, it was determined that a set of data records were to be displayed, and the data records 202, 204 were included in the set of data records. In the example of FIG. 2A, the prominence level of the data records 202, 204 was set to the first prominence level, discussed above. Consequently, the data records 202, 204 are displayed in the auxiliary pane 230. For example, the flight that is the subject of the data record 202 is scheduled to depart approximately 5 days from the time/date, at which the search query 208 was submitted. Consequently, it was determined that the time/date associated with the data record exceeds a threshold time, e.g., 24 hours, and the data record 202 is not prominently displayed. In this example, the data record 204 can inherit the display prominence of the data record 204.

In the example of FIG. 2B, the search query 208 [Generic Airways] was entered by the user and was processed by a search system, e.g., the search system 120 of FIG. 1, in view of one or more trigger rules. Based on the one or more trigger rules, it was determined that a set of data records were to be displayed, and the data records 202, 204 were included in the set of data records. Consequently, the data records 202, 204 are displayed in the search results pane 220. In the example of FIG. 2B, the prominence level of the data records 202, 204 was set to the second prominence level, discussed above. For example, the flight that is the subject of the data record 202 is scheduled to depart approximately 22 hours from the time/date, at which the search query 208 was submitted. Consequently, it was determined that the time/date associated with the data record did not exceed the threshold time, e.g., 24 hours, and the data record 202 is prominently displayed. In this example, the data record 204 can inherit the display prominence of the data record 204. Further, the data record 202 now includes an action element 240. In this example, the action element 240 includes a user-selectable, e.g., clickable, button that enables the user to check-in for the flight that is the subject of the data record 202. For example, in response to user selection of the action element 240, the user can navigate to a flight check-in website associated with Generic Airways.

Figure 3:
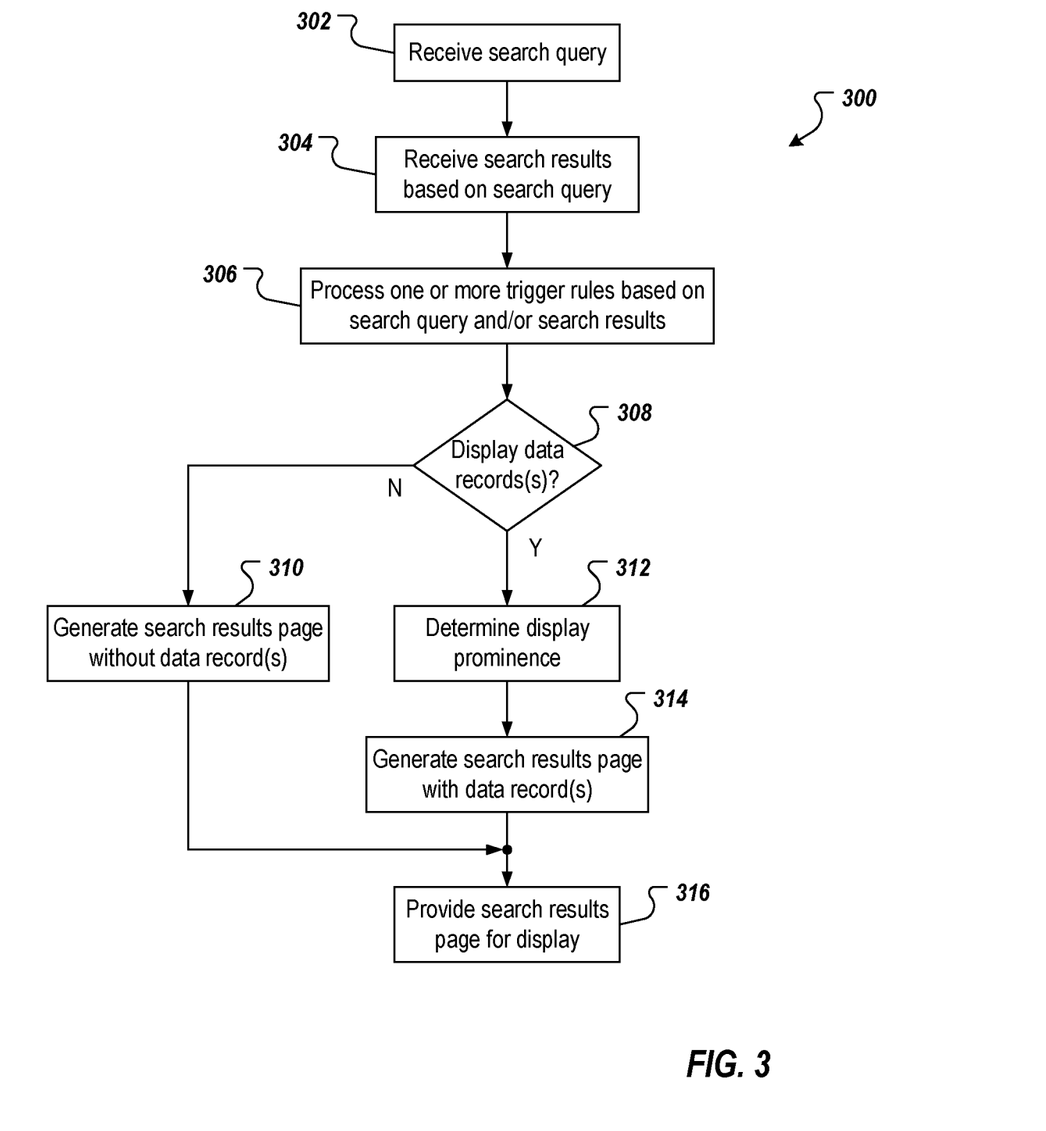
FIG. 3 is a flowchart of an example process for data records in search results.

FIG. 3 is a flowchart of an example process 300 for providing recommended content in search results. In some examples, the process 300 can be provided using one or more computer-executable programs that are executed using one or more computing devices. For example, process 300 can be provided, for example, by the example environment 100 of FIG. 1.

A search query is received (302). For example, the search query can be received by the search system 120 of FIG. 1. Search results based on the search query are received (304). For example, the search system 120 can receive search results that are responsive to the search query. One or more trigger rules are processed based on the search query and/or the search results (306). For example, the search system 120 can process the one or more trigger rules based on the search query and/or the search results, as discussed in detail herein. It is determined whether a set of data records is to be displayed (308) with the search results. For example, the search system 120 can determine whether a set of data records is to be displayed. As discussed above, a set of trigger records can be displayed if at least one trigger rule of the one or more trigger rules triggers display of a set of data records.

If a set of data records is not to be displayed, a search results display is generated without the set of data records (310). If a set of data records is to be displayed, relevant data records are included in the set of data records and a display prominence is determined (312). For example, the search system 120 can provide the set of data records, e.g., by retrieving relevant data records from the data record system 130, and can determine the display prominence, as discussed in detail herein. A search results display with the set of data records is generated (314). For example, the search system 120 can generate the search results display. The search results display is provided for display (316). For example, the search system 120 can provide the search results display 111 for display on a user device 106.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., web document, to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by one or more processors, the method comprising:
   receiving, by the one or more processors, search queries, each search query being provided by a user at different times;
   for each search query provided by the user, determining a set of user-specific data records is to be displayed in a search results page with search results responsive to the search query, the set of user-specific data records comprising one or more user-specific data records that are specific to the user that provided the search query and wherein each user-specific data record specifies an event made by the user and a time of the event;
   determining, based on a difference between the time of the event being in the future and a time that the search query was provided, a display prominence for at least one user-specific data record specifying the event in the set of user-specific data records when the user-specific data record is displayed within the search results page, the display prominence comprising one of a plurality of display locations for the at least one user-specific data record within the search results page, and indicating a prominence of the at least one user-specific data record when displayed in the search results page, at least one of the display locations being within a search results pane displayed on a user device and within which the one or more search results are also displayed;
   when the determined display prominence indicates the user-specific data record is not to be prominently displayed in the search results page, providing the search results responsive to the query and the set of user-specific data records for display to the user device, wherein the user-specific data record does not include an action element that enables a user to take an action specific to the user-specific event, and the user-specific data record is displayed in a first location relative to the search results in the search results page; and
   when the determined display prominence indicates the data record is to be prominently displayed:
      including, with the user-specific data records, data that causes the action element that enables the user to take an action specific to the user-specific event to be displayed with the user-specific data record in the search results page; and
      providing the search results and the set of user-specific data records for display to the user device, wherein the user-specific data record is displayed in a second location relative to the search results and different from the first location in the search results page.

2. The computer-implemented method of claim 1, wherein the display prominence indicates a visual effect to the at least one user-specific data record within the search results page.

3. The computer-implemented method of claim 1, wherein all data records in the set of user-specific data records are associated with the display prominence.

4. The computer-implemented method of claim 1, wherein providing the search results and the set of user-specific data records for display comprises providing a search results display, the search results display displaying the search results and the set of user-specific data records, the at least one user-specific data record being displayed within the search results display based on the display prominence.

5. The computer-implemented method of claim 1, wherein the set of user-specific data records are provided in chronological order based on a date and a time of each of the data records.

6. The computer-implemented method of claim 1, wherein the action element is selectable by a user to complete an action associated with the subject of the data record.

7. A system comprising:
   a data store for storing data records; and
   one or more processors configured to interact with the data store, the one or more processors being further configured to perform operations comprising:
      receiving, by the one or more processors, search queries, each search query being provided by a user at different times;
      for each search query provided by the user, determining a set of user-specific data records is to be displayed in a search results page with search results responsive to the search query, the set of user-specific data records comprising one or more user-specific data records that are specific to the user that provided the search query and wherein each user-specific data record specifies an event made by the user and a time of the event;
      determining, based on a difference between the time of the event being in the future and a time that the search query was provided, a display prominence for at least one user-specific data record specifying the event in the set of user-specific data records when the user-specific data record is displayed within the search results page, the display prominence comprising one of a plurality of display locations for the at least one user-specific data record within the search results page, and indicating a prominence of the at least one user-specific data record when displayed in the search results page, at least one of the display locations being within a search results pane displayed on a user device and within which the one or more search results are also displayed;
      when the determined display prominence indicates the user-specific data record is not to be prominently displayed in the search results page, providing the search results responsive to the query and the set of user-specific data records for display to the user device, wherein the user-specific data record does not include an action element that enables a user to take an action specific to the user-specific event, and the user-specific data record is displayed in a first location relative to the search results in the search results page; and when the determined display prominence indicates the data record is to be prominently displayed:

including, with the user-specific data records, data that causes the action element that enables the user to take an action specific to the user-specific event to be displayed with the user-specific data record in the search results page; and providing the search results and the set of user-specific data records for display to the user device, wherein the user-specific data record is displayed in a second location relative to the search results and different from the first location in the search results page.

8. The system of claim 7, wherein the display prominence indicates a visual effect to the at least one user-specific data record within the search results page.

9. The system of claim 7, wherein all data records in the set of user-specific data records are associated with the display prominence.

10. The system of claim 7, wherein providing the search results and the set of user-specific data records for display comprises providing a search results display, the search results display displaying the search results and the set of user-specific data records, the at least one user-specific data record being displayed within the search results display based on the display prominence.

11. The system of claim 7, wherein the set of user-specific data records are provided in chronological order based on a date and a time of each of the data records.

12. The system of claim 7, wherein the action element is selectable by a user to complete an action associated with the subject of the data record.

13. A non-transitory computer storage medium encoded with a computer program, the program comprising instruction that when executed by data processing apparatus cause the data processing apparatus to perform operations comprising:

receiving, by the one or more processors, search queries, each search query being provided by a user at different times;

for each search query provided by the user, determining a set of user-specific data records is to be displayed in a search results page with search results responsive to the search query, the set of user-specific data records comprising one or more user-specific data records that are specific to the user that provided the search query and wherein each user-specific data record specifies an event made by the user and a time of the event;

determining, based on a difference between the time of the event being in the future and a time that the search query was provided, a display prominence for at least one user-specific data record specifying the event in the set of user-specific data records when the user-specific data record is displayed within the search results page, the display prominence comprising one of a plurality of display locations for the at least one user-specific data record within the search results page, and indicating a prominence of the at least one user-specific data record when displayed in the search results page, at least one of the display locations being within a search results pane displayed on a user device and within which the one or more search results are also displayed;

when the determined display prominence indicates the user-specific data record is not to be prominently displayed in the search results page, providing the search results responsive to the query and the set of user-specific data records for display to the user device, wherein the user-specific data record does not include an action element that enables a user to take an action specific to the user-specific event, and the user-specific data record is displayed in a first location relative to the search results in the search results page; and when the determined display prominence indicates the data record is to be prominently displayed:

including, with the user-specific data records, data that causes the action element that enables the user to take an action specific to the user-specific event to be displayed with the user-specific data record in the search results page; and providing the search results and the set of user-specific data records for display to the user device, wherein the user-specific data record is displayed in a second location relative to the search results and different from the first location in the search results page.

* * * * *